United States Patent [19]
Beretta et al.

[11] Patent Number: 5,462,371
[45] Date of Patent: Oct. 31, 1995

[54] INDEXING PLANETARY GEAR TRAIN FOR A PRINTER

[75] Inventors: Robert K. Beretta; Jason M. Quintana, both of Vancouver, Wash.

[73] Assignee: Hewlett-Packard Company, Palo Alto, Calif.

[21] Appl. No.: 263,848

[22] Filed: Jun. 21, 1994

[51] Int. Cl.⁶ ................................................. B41J 17/02
[52] U.S. Cl. ........................ 400/569; 400/545; 400/551
[58] Field of Search ................................. 475/341, 342; 250/231.13; 400/547.4, 556.2, 569, 636.2, 545, 551

[56] References Cited

U.S. PATENT DOCUMENTS

| | | | |
|---|---|---|---|
| 3,836,139 | 9/1974 | Shimizu | 271/95 |
| 3,972,280 | 8/1976 | Swatik et al. | 101/93.16 |
| 4,366,727 | 1/1983 | Jonsson | 475/342 |
| 4,500,780 | 2/1985 | Buan et al. | 250/231.13 |
| 4,785,688 | 12/1988 | Shiozaki et al. | 74/710.5 |
| 4,864,893 | 9/1989 | Hori | 475/342 |
| 4,882,943 | 11/1989 | Pipon et al. | 475/342 |
| 5,033,886 | 7/1991 | Onodera et al. | 400/146 |
| 5,038,243 | 8/1991 | Gordon | 341/2 |
| 5,118,090 | 6/1992 | Sonoda et al. | 271/10 |
| 5,160,128 | 11/1992 | Oishi | 271/114 |
| 5,233,389 | 8/1993 | Deguchi et al. | 355/234 |

Primary Examiner—Edgar S. Burr
Assistant Examiner—John S. Hilten
Attorney, Agent, or Firm—Flory L. Martin

[57] ABSTRACT

An indexing double planetary gear train forms a portion of a feed system for accurately advancing a print media sheet through a printer. The planetary gear train has primary and secondary rings coupled to a sun gear by a series of planet gear clusters. Each planet gear cluster has primary and secondary planet gears which engage the respective primary and secondary rings. By assembling at least two of the gear train components to be fully indexing, and through the use of the identical planet gear clusters formed in a single mold, imperfections in the planet clusters and the rings, such as tooth-to-tooth defects or eccentricity, are canceled and have no effect on the accuracy of the line feed increments. Thus, more accurate and uniform media advance is achieved using plastic molded gears which are also relatively low in cost to manufacture and easy to assemble.

17 Claims, 5 Drawing Sheets

INDEXING PLANETARY GEAR TRAIN FOR A PRINTER

FIELD OF THE INVENTION

This invention relates generally to a print media feed system for a printing mechanism, such as an inkjet printer or plotter, and more particularly to a feed system having an indexing planetary gear train apparatus and a method for accurately advancing the print medium through the printing mechanism.

BACKGROUND OF THE INVENTION

Inkjet printing mechanisms use pens which shoot drops of ink onto a page or sheet of a print medium. Each pen has a printhead formed with very small nozzles through which the ink drops are fired. To print an image, the printhead moves back and forth across the page shooting ink drops as it moves. Inkjet printing mechanisms may be included in a variety of different devices, such as inkjet printers, plotters, scanners, facsimile machines, or other devices, all of which are referred to collectively herein as "inkjet printers." The print medium is typically a sheet material, such as paper, mylar, foils, transparencies, card stock, etc., but for convenience the term "paper" is used herein for purposes of illustration.

High resolution printing systems, such as those used in the inkjet art, need to advance the media through a discrete forward movement. Prior to every pass of the printhead, the media must be brought to a complete stop. Each of these media movements are referred to herein as a "line feed." Of course, the exact magnitude of each line feed is a function of the particular printing system. Any deviation in the magnitude of an actual line feed from the desired magnitude of that line feed is referred to herein as a "line feed error." Line feed errors are often manifested as various printing defects, including banding, steps in diagonal lines, or tonality changes in a shingled pattern of color or gray scale.

For example, some line feed errors are acceptable, such as those which are so minute as to be unnoticeable to the human eye. Unfortunately, the magnitude of an acceptable line feed error in a printer having a resolution of 600 dots per inch ("dpi") is less than the magnitude of the tolerances associated with the typical plastic parts that are used in a conventional paper drive gear train. Thus, it is apparent that an acceptable line feed accuracy cannot be obtained if the accuracy is the dependent upon the form of the plastic parts in the gear train.

To better understand the operation of such gear trains, a few terms need to be described. A gear train in a paper drive is considered to have "indexing properties" when some part of the gear train either rotates through one full revolution, or achieves a state of complete realignment, for each line feed. In a reduction gear assembly, not all of the gear components can be indexing. If each component were fully indexing, the gear ratio (input to output speed) would be 1:1, which would negate any speed reduction. Thus, in a speed reduction gear having "indexing properties," one or more, but not all, of the components are indexing.

Since an indexing gear train has properties designed for a given line feed size, it is limited to accurately accomplishing only a single size of line feed. When line feeds of arbitrary magnitude are required, the indexing properties are not utilized.

For example, FIG. 5 shows a side elevational view of a prior art single pinion gear reduction assembly G used to achieve partial indexing, which has a pinion gear P driving a bull gear B. This indexing system rotates the pinion gear P through one full turn for each line feed. In this system G, any defects in the form of the pinion gear P, such as eccentricity, do not contribute to line feed errors. Unfortunately, for a practical desk top sized printer system, one full turn of the pinion gear P results in only 1/20 of a revolution of the bull gear B. If the magnitude of the line feed required is much smaller than this, such as on the order of 1/80 of a revolution for a print swath advance of 0.21 cm (1/12 inch line feed) using a 5.08 cm (2.0 inch) diameter media drive roller, then an 80:1 gear ratio is required. Such a large gear ratio requires either a very large bull gear B, or a very small pinion gear P. Such a large bull gear consumes excessive space within a printer, whereas such a small pinion gear soon reaches design limits in terms of teeth strength and material selection for the pinion.

Another indexing gear assembly involves an indexing ratchet-pawl drive system that uses a one-tooth pawl acting on a multi-tooth ratchet. Unfortunately, such a system can never make a partial step media advance, regardless of the accuracy requirement, simply because it is impossible to stop on half a tooth. Thus, a significant limitation of the ratchet-pawl system is the requirement that each relative media advance remain constant. Another disadvantage of the ratchet-pawl system is that the absolute position of the pen must always be a multiple of the advance size.

Thus, a need exists for an improved print media handling system for accurately advancing a print medium through a printing mechanism, which is directed toward overcoming, and not susceptible to, the above limitations and disadvantages.

SUMMARY OF THE INVENTION

According to one aspect of the present invention, a print media feed system is provided for use in a printing mechanism having a chassis and a print zone. The feed system includes a drive motor and media advance mechanism that propels print media through the print zone. The feed system also has an indexing planetary gear assembly that couples the drive motor to the media advance mechanism. The gear assembly has several components, including, a primary ring supported by the chassis and a secondary ring coupled to the drive media advance mechanism. The assembly also has a sun gear driven by the motor and plural planet gear sets or clusters. Each planet gear cluster has stacked primary and secondary planet gears. The primary planet gears engage the primary ring, whereas the secondary planet gears engage the secondary ring. For a selected line feed increment, at least two of the plural components of the planetary gear assembly are full indexing for each line feed increment.

According to another aspect of the present invention, a print media feed system is provided with the plural planet gear clusters each being a molded gear set, with each set formed in the same mold. At least one of the components of the planetary gear assembly has at least one error portion which is nonuniform with respect to the other portions. Any detrimental effect of this error portion is canceled by the molded plastic gears. While the molded plastic gears may have some nonconforming errors, since each of these errors are identical on each planet gear, the errors cancel out one another and ideal operation is achieved.

According to a further aspect of the present invention, the fully indexing nature of at least two of the components of the gear assembly cancel any detrimental effect of any error portion of the gear assembly components.

According to still another aspect of the present invention, a method is provided of advancing a print media in selected line feed increments through a print zone of a printing mechanism. The method includes the steps of coupling a media advance mechanism that propels the print media through the print zone to a drive motor with an indexing planetary gear assembly, which may be as described above. In an advancing step, the print media is advanced through a first line feed increment by the printing mechanism. At the beginning of this increment, an alignment indicia of the first planet gear set is oriented in a first direction, whereas alignment indicia of a second planet gear set is oriented in the opposite direction. At the end of the first line feed increment, in a rearranging step, a second planet gear set is moved into a position and orientation previously occupied by a first planet gear set at the beginning of the first line feed increment. In the illustrated embodiment, the sun gear turns one full revolution for each line feed increment.

An overall goal of the present invention is to provide an accurate print media advancing system for use in printing mechanisms, such as inkjet printing mechanisms.

A further goal of the present invention is to provide enhanced print quality in an inkjet printing mechanism.

Another goal of the present invention is to provide an accurate print media advancing system that is economical to manufacture, energy efficient and that occupies a relatively small physical space within a printing mechanism.

DETAILED DESCRIPTION OF THE PREFERRED EMBODIMENTS

Figure 1:
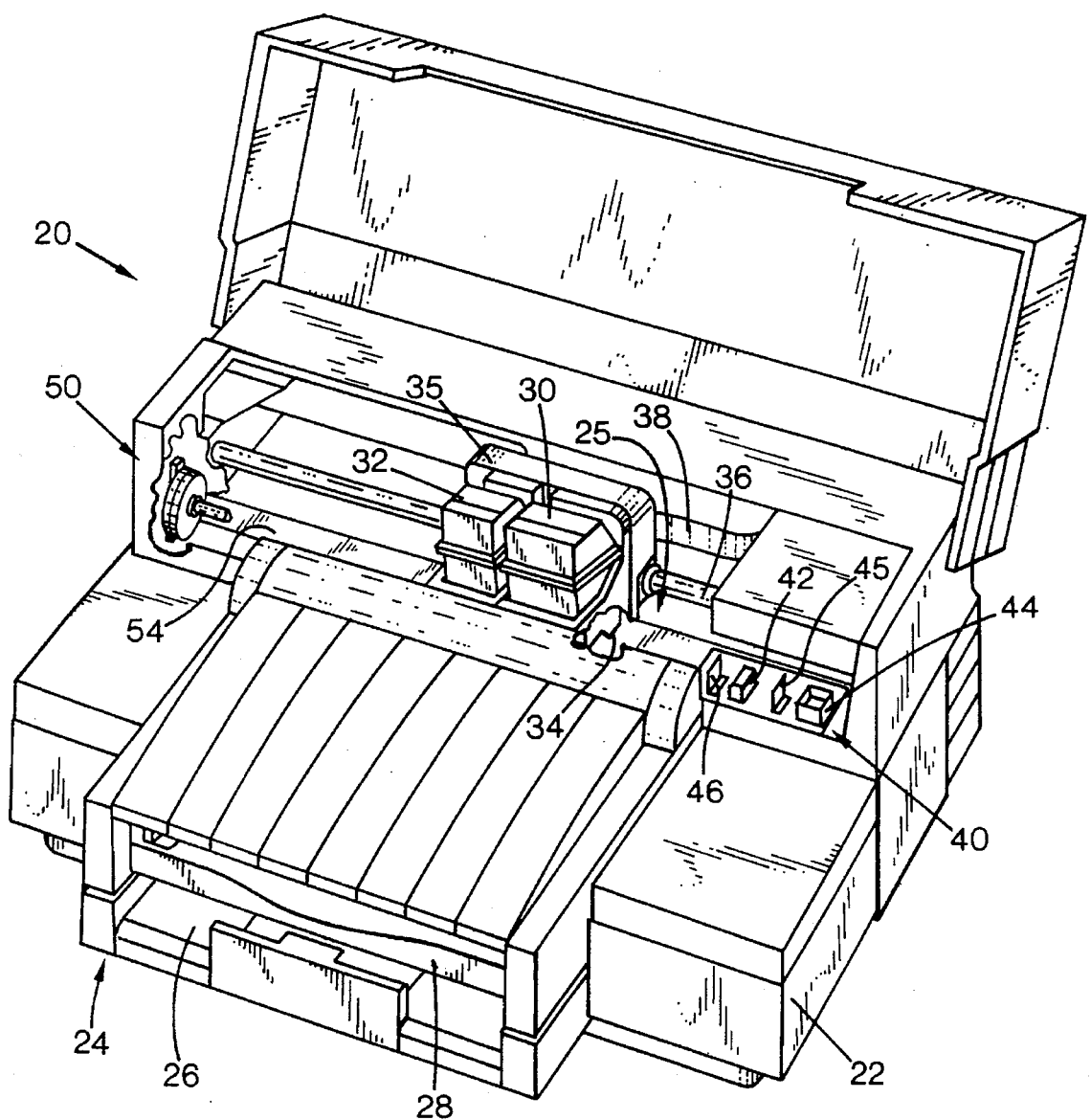
FIG. 1 is a perspective view of one form of a print media advancing system of the present invention illustrated in use in an inkjet printing mechanism.

FIG. 1 illustrates an embodiment of an inkjet printing mechanism, here shown as an inkjet printer 20, constructed in accordance with the present invention, which may be used in desktop publishing, in printing business reports, correspondence, and the like, in either an industrial, office or home environment. Other inkjet printing mechanisms may embody the present invention, such as plotters, portable printing units, and facsimile machines, to name a few, but for convenience the concepts of the present invention are illustrated in the environment of an inkjet printer 20.

While it is apparent that the printer components may vary from model to model, the typical inkjet printer 20 includes a chassis 22 and a print medium handling system 24 for supplying a print medium to the printer 20. The print medium may be any type of suitable sheet material, such as sheets of paper, card-stock, foils, mylar, transparencies, and the like, but for convenience, the illustrated embodiment is described using paper as the print medium. The print medium handling system 24 delivers the sheets into a print zone 25 from a feed tray 26, and then into an output tray 28. An illustrated embodiment of a print medium handling system 24 constructed in accordance with the present invention is described further below with respect to FIGS. 2–4. In the print zone 25, the ink droplets are shot from an inkjet cartridge or pen, such as a color ink cartridge 30 and/or a black ink cartridge 32. The illustrated color cartridge 30 is a tri-color pen, although in some embodiments (not shown), a group of discrete monochrome pens may be used, or a single monochrome black pen 32 may be used.

The illustrated cartridges 30, 32 each include reservoirs for storing a supply of ink therein, although other ink supply storage arrangements, such as those having reservoirs mounted along the housing (not shown) may also be used. The cartridges 30, 32 each have a printhead, such as printhead 34 on the color cartridge 30. Each printhead has a bottom surface comprising an orifice plate (not shown) with a plurality of nozzles formed therethrough in a manner well known to those skilled in the art. In the illustrated embodiment, the cartridges 30, 32 have thermal inkjet printheads, although other types may be used, such as piezoelectric printheads. A thermal printhead typically includes a plurality of resistors (not shown) which are associated with the nozzles. Upon energizing a selected resistor, a bubble of ink is formed and then ejected from the nozzle into the print zone 25 and onto a sheet of paper under the nozzle.

The pens 30, 32 are transported by a carriage 35 which may be driven along a guide rod 36 by a conventional drive belt/pulley and motor arrangement (not shown). The pens 30, 32 selectively deposit one or more ink droplets on a sheet of paper in accordance with instructions received via a conductor strip 38 from a printer controller, such as a microprocessor (not shown), located within chassis 22. The controller generally receives instructions from a computer (not shown), such as a personal computer. The printhead carriage 35, as well as the carriage motor (not shown) and paper handling system drive motor (not shown) each operate in response to the printer controller, which operates manner well known to those skilled in the art. A monitor (not shown) coupled to the computer may be used to display visual information to an operator, such as the printer status or a particular program being run on the computer. Personal computers, their input devices, such as a keyboard and/or a mouse device (not shown), and monitors are all well known to those skilled in the art.

The printer 20 may include a conventional service station assembly 40 having a platform upon which may be mounted conventional inkjet pen caps, such as a black ink cap 42 and a color cap 44. The platform may also support wipers, such as conventional color and black ink wipers 45, 46 which wipe the printheads of the respective color and black cartridges 30, 32, such as the color printhead 34.

Figure 2:
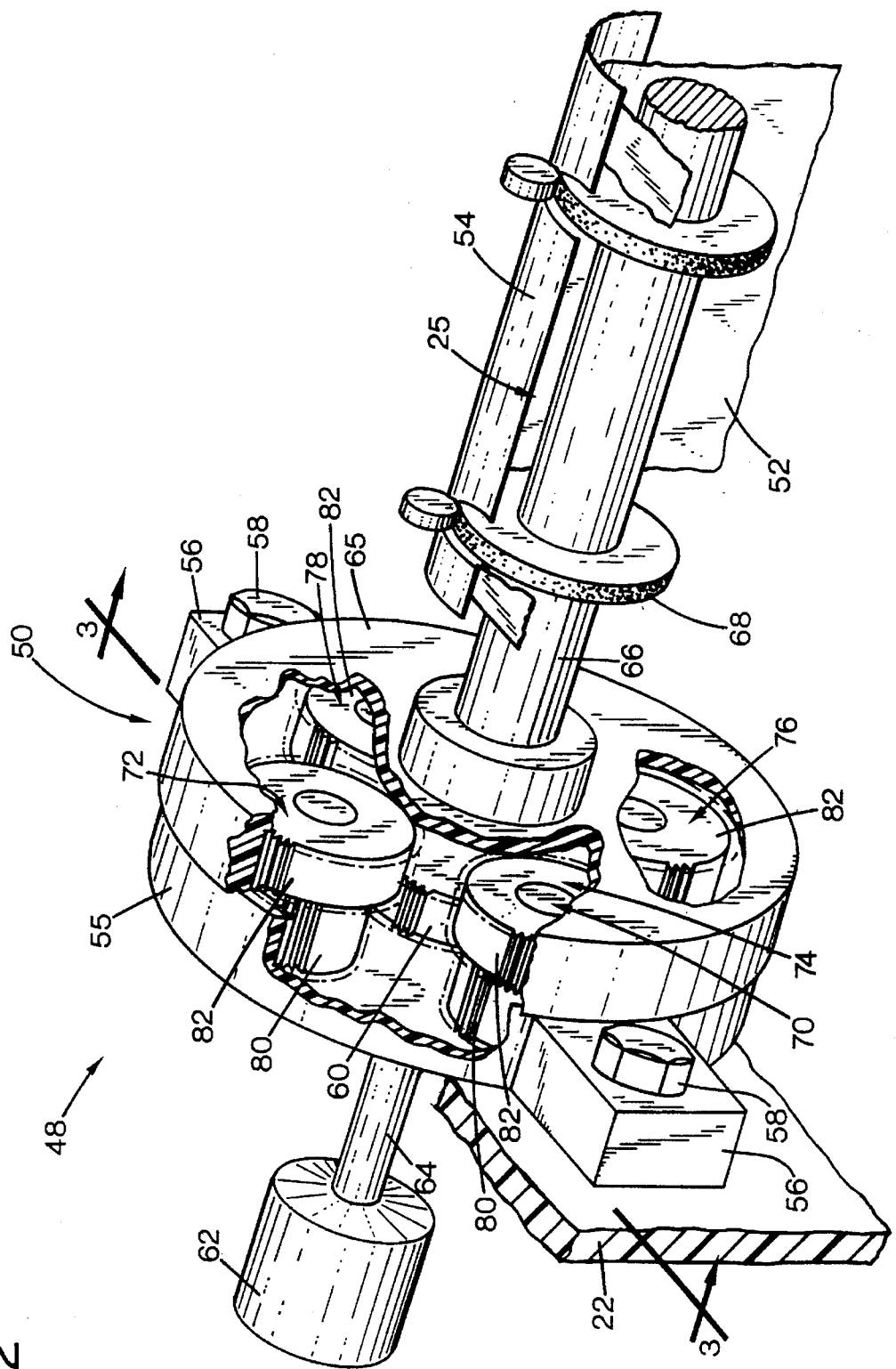
FIG. 2 is an enlarged, partially cut away, perspective view of one form of the print media advancing system of FIG. 1.
Figure 3:
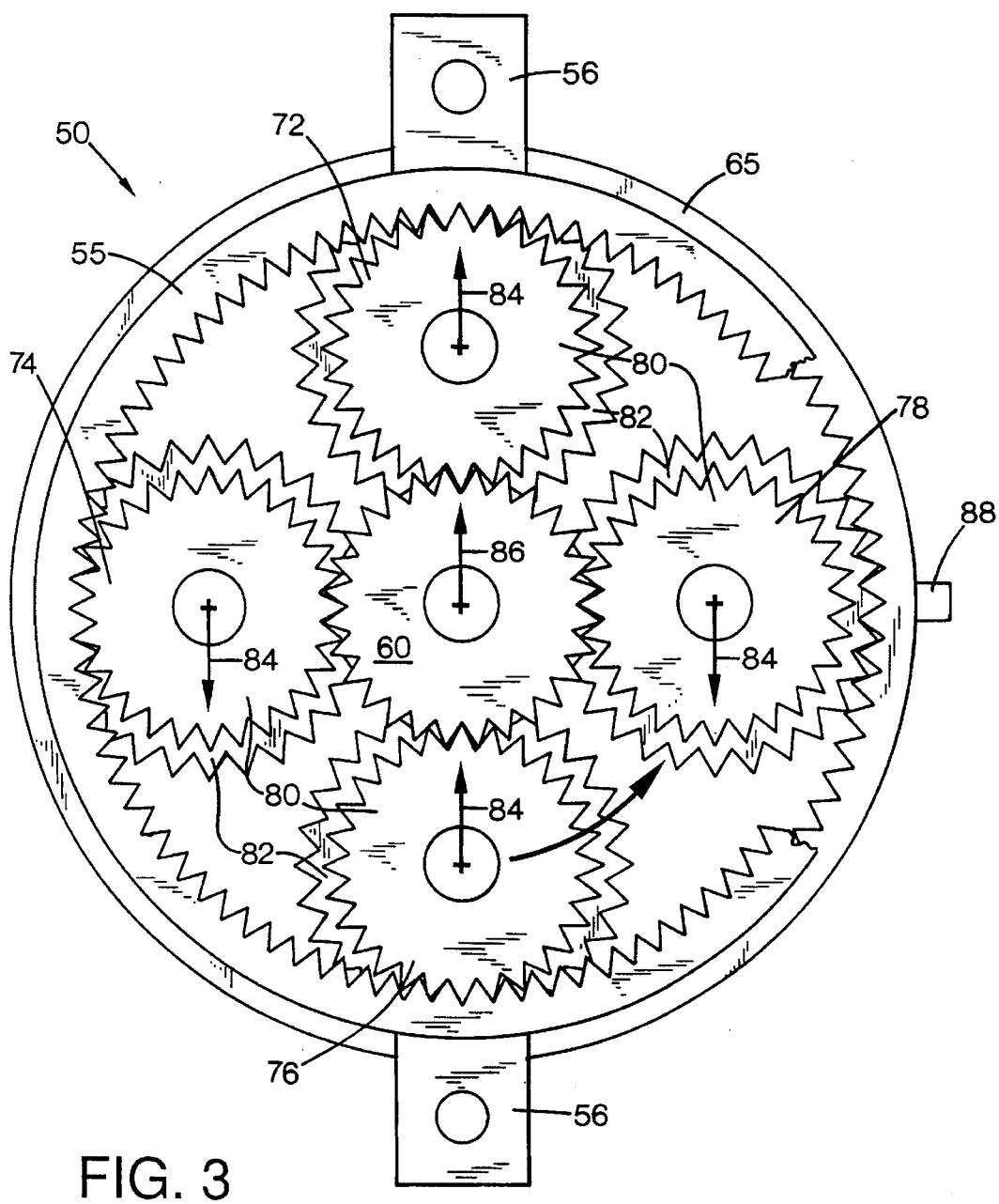
FIG. 3 is an enlarged, partially cut away, side elevational view of the system of FIG. 2 taken along lines 3—3 thereof.
Figure 4:
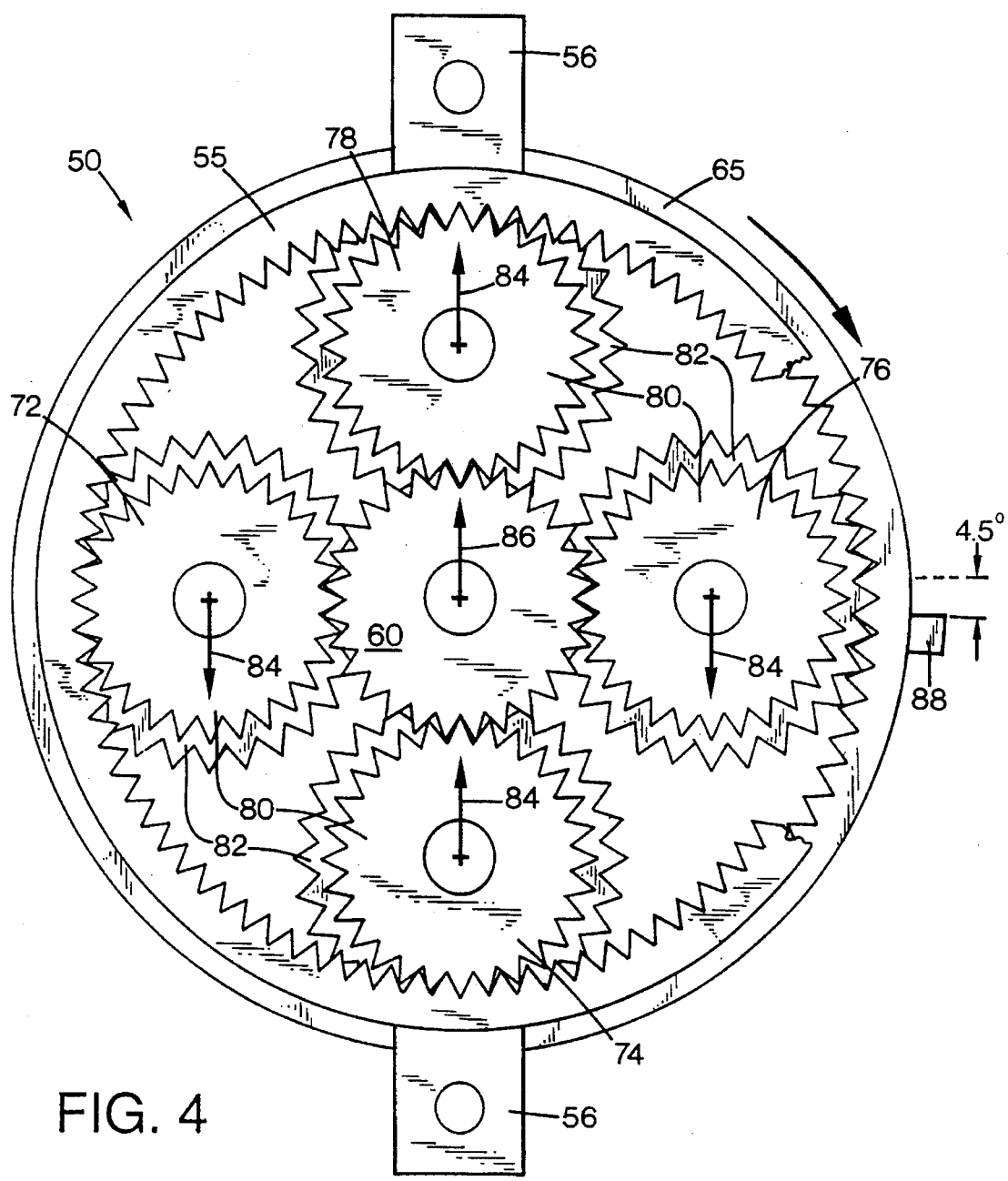
FIG. 4 shows the system of FIG. 3 after one revolution of the sun gear.
Figure 5:
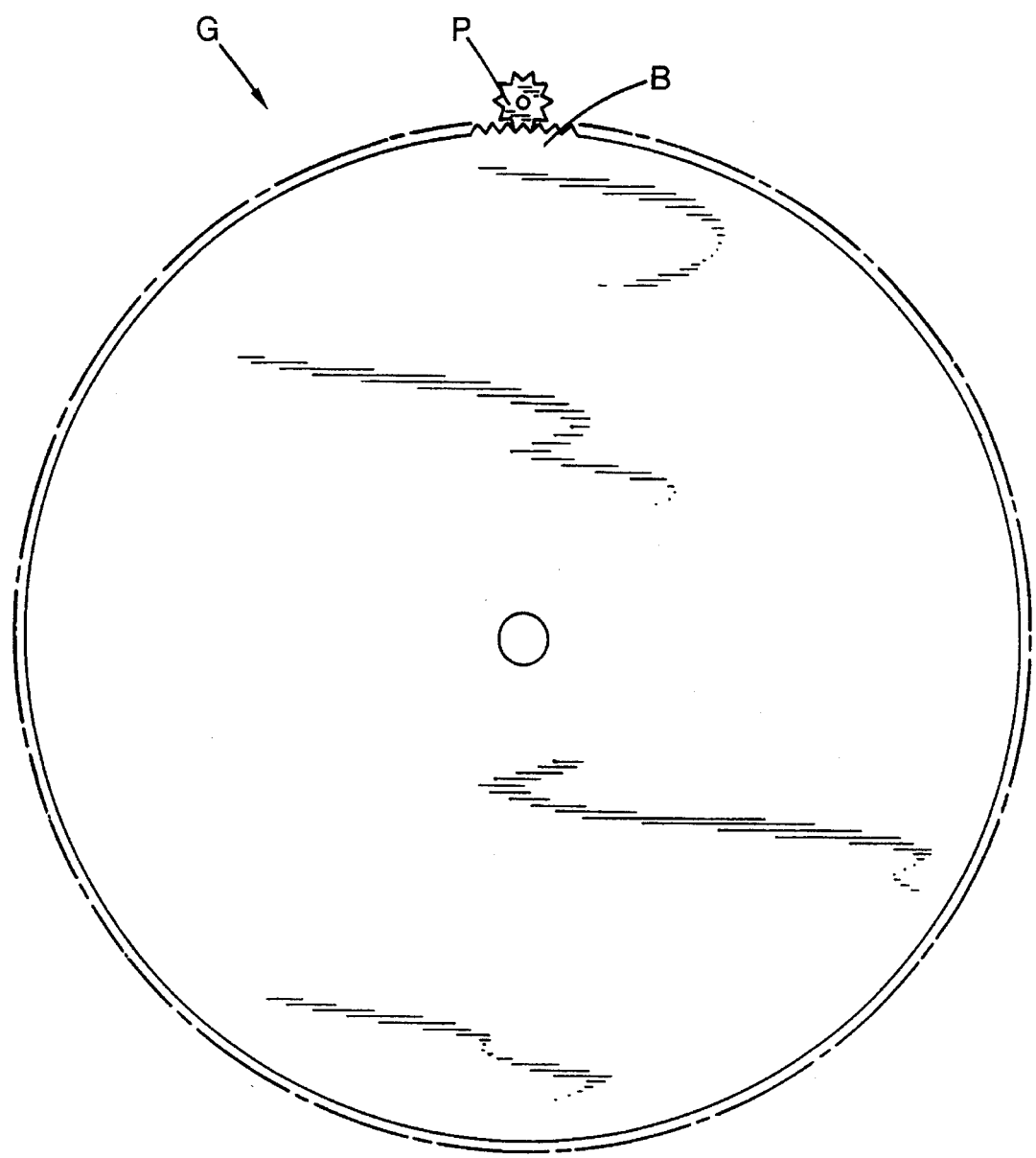
FIG. 5 is a side elevational view of a prior art print media advance system.

FIGS. 2–4 show in greater detail the illustrated print medium handling system 24 as having a feed system 48. The feed system 48 has an indexing planetary gear assembly or gear train 50 constructed in accordance with the present invention for accurately advancing a print media sheet or page 52 across a platen 54 adjacent the print zone 25. The gear train 50 includes a primary ring 55 which has mounting members, such as ears 56 with holes therethrough for receiving bolts 58, or other fasteners for securing the ring 55 to the printer chassis 22. The gear train 50 also includes a primary sun gear 60. The feed system 48 has a motor 62 coupled to a shaft 64 which delivers input torque to the sun gear 60. The motor 62 is illustrated schematically in FIG. 2, and may be any type of conventional or other printer motor, such as a stepper motor, for instance. Other linkage mechanisms (not shown) known to those skilled in the art may be used to link the motor 62 and sun gear 60, such as other gearing arrangements, belt drives, and the like.

The output torque of the gear train 50 is provided by a secondary ring 65 which is coupled to an output shaft 66. Components on the torque input side of the gear train 50 are referred to a "primary," while those on the output side are "secondary" components. Several print media engaging rollers, such as roller 68, may be mounted on the output shaft 66. The rollers 68 may be any type of conventional or other roller, such as an elastomeric roller, a toothed roller, or one having a periphery surrounded by an abrasive, sandpaper-like, material. The rollers 68 compress each media sheet 52 against the platen 54. While the rollers 68 are shown mounted to the output shaft 66, it is apparent that an intermediate shaft or other device (not shown) may be used to transmit the frictional torque forces from the gear train 50 to propel page 52 through the print zone 25. In the illustrated embodiment, the output shaft 66 and rollers 68 comprise a media advance mechanism that, when driven by the gear train 50 and motor 62, may advance the paper 52 in selected line feed increments through the print zone 25.

To achieve the goal of smaller line feed increments, the gear assembly 50 includes a group of planet clusters or gear sets 70, here illustrated as four clusters 72, 74, 76 and 78. In the illustrated embodiment, the first and third planet clusters 72, 76 form a first diametrically opposed pair, and the second and fourth clusters 74, 78 form a second pair. Each of the planet clusters 72–78 includes a primary planet gear 80 and a secondary planet gear 82, which are coaxial or stacked gears rotating about a single axis. As shown in FIGS. 3 and 4, each planet cluster includes an alignment indicia on a face of either the primary or secondary gears 80, 82, here, illustrated as arrows 84 located on the outside face of the primary planet gears 80. The sun gear 60 also includes an alignment indicia, such as arrow 86. An advancement of the secondary ring 65 may be indicated by a locator indicia, such as an extending arm or tab 88.

The planetary gear train 50 has indexing properties, as described above in the background portion, because at least one part of the gear train either rotates through a full revolution, or achieves a state of complete realignment, with each line feed increment. While various criteria may be specified to achieve this fully indexing property, the following illustrates a preferred indexing criteria for making and using the illustrated gear train 50. The following variables are used to illustrate this indexing criteria:

R1=primary ring 55
R2=secondary ring 65
P1=primary planet gear 80
P2=secondary planet gear 82
S=sun gear 60
Np=number of planetary gear clusters within group 70
r=radius
t=number of teeth.

To achieve a fully indexing primary side for gear train 50, including primary ring 55, primary planet gears 80, and sun gear 60, the gears are sized is according to the following equations:

$$r_{R1}=(r_{P1})(Np-1)$$

$$r_S=(r_{R1})-(2)(r_{P1})$$

The first of the above equations is the criteria for obtaining a fully indexing primary side, which results in error elimination as described further below. The second equation sets forth the criteria for the sun gear 60 to fit with respect to the group of planet clusters 70.

To facilitate assembly of the primary side of gear train 50, the following criteria may be used:

$$t_{R1}/Np=\text{integer}$$

$$t_{P1}/Np=\text{integer}$$

$$t_S/Np=\text{integer}$$

This assembly criteria guarantees that the planetary gear train can indeed be assembled, and it insures ease of arranging of the primary planet gears 80 with respect to the primary ring 55 and sun gear 60.

For establishing the size of the secondary ring 65 and the secondary planet gears 82, the following criteria may be used:

$$r_{R2}=r_S+r_{P1}+r_{P2}$$

It is apparent that the diameter of the secondary planet gears 82 has an upper limit established by the space available within the secondary ring 65. That is, the planet gears 82 cannot become so large that they intersect one another within the confines of the secondary ring 65.

In the preferred embodiment, the number of the teeth of the primary and secondary planet gears 80, 82 are selected to be equal ($t_{P1}=t_{P2}$), so the pitch of the teeth of the primary and secondary planet gears 80, 82 must then be different. Given this criteria then, for the secondary side of gear train 50, comprising the secondary ring 65 and each of the secondary planet gears 82, it follows that:

$$t_{P2}/Np=\text{integer}$$

$$t_{R2}/Np=\text{integer}$$

The general formula for the gear ratio of a double planetary drive from the input shaft 64 to the output shaft 66 may be determined as follows:

$$\text{gear ratio}=[(2)(r_{P1})(r_S+r_{P1}+r_{P2})] \div [(r_S)(r_{P1}-r_{P2})]$$

Recent advances in inkjet pen technology have made higher resolution cartridges 30, 32 (e.g., 600 dpi newer pens versus 300 dpi older pens) more economical to manufacture, and through decreased pricing, available to a larger segment of consumers. To fully take advantage of these higher resolution pens, more accurate and smaller incremental advancing of the print media 52 is desired. In the illustrated example, the printer 20 is typically equipped with a media roller 68 having a 5.08 cm (2.0 inch) diameter, so the circumference of the roller is approximately 16.26 cm (6.4 inches). By selecting the line feed increment to be 1/80 of a revolution of the secondary ring 65, the page 52 is advanced in an incremental print swath step of 0.21 cm (1/12 inch) for each rotation of the sun gear 60. Thus, the media advance for a pen having a print swath width or nozzle height of 0.42 cm (1/6 inch) may take place in half steps relative to the swath width, whereas one quarter, one half and three-quarter advance steps are possible for a pen having a swath width of 0.33 cm (1/3 inch).

Given design criteria and the formulas above, for the illustrated four cluster gear train 50, the number of teeth for each component are as follows:

| Component | Teeth |
| --- | --- |
| Sun Gear (60) | 28 |
| Primary Ring (55) | 84 |
| Primary Planet (80) | 28 |
| Secondary Planet (82) | 28 |
| Secondary Ring (65) | 80 |

The same number of teeth may be used on both the primary and secondary planet gears 80, 82, which facilitates ease of assembly and tooth alignment. It has been discovered that if the primary and secondary planet gears have a different number of teeth, then the planet gear clusters may only be assembled in very specific configurations. This is a severe detriment to ease of assembly, during both initial manufacture and any repair. Indeed, where the primary and secondary planet gears have a different number of teeth, each different set of tooth counts may have a different set of assembly criteria, and in many cases, no possible assembly configuration may even exist. Thus, a variety of manufacturing and assembly advantages are realized by the preferred selection of an equal number of teeth for the primary and secondary planet gears 80, 82.

FIG. 3 shows the double planetary gear train 50 in an initial configuration. The alignment indicia 84 on the planet gears, and the arrow indicia 86 on the sun gear, represent features which are preferably molded into the gear faces. The alignment arrows 84 and 86 may be used for initially assembling the gear train 50. Preferably, the planet gear clusters 70 are each molded gears, formed of a plastic material. Even more preferably, each cluster 70 is made in the same mold cavity. In this manner, if the mold cavity has any irregularities or slight defects, such as eccentricity or minor tooth deviations, each of the clusters 70 in gear train 50 will be identical. By assembling the planet clusters 70 in the configuration illustrated in FIG. 3, any defects in the identical planet gears 80, 82 will cancel through the indexing property of gear train 50, as described further below. A comparison of FIGS. 3 and 4 illustrates the full indexing properties of the double planetary gear assembly 50.

In operation, FIG. 4 shows the gear train 50 after the motor 62 has advanced the secondary ring 65 one line feed increment from the initial configuration of FIG. 3 by turning the sun gear 60 through one full revolution. First, the sun gear 60 in FIG. 4 is realigned with its initial configuration in FIG. 3 with respect to the primary ring 55, as well as with respect to the group of planet clusters 70. Thus, the sun gear 60 is fully indexing. Second, after one line feed increment, each of the four planet clusters 70, has moved to occupy exactly the same position and orientation held by the planet cluster that was immediately adjacent to it in the counterclockwise direction. For instance, the space previously occupied by the second gear cluster 74 in FIG. 3 is occupied by the first gear cluster 72 in FIG. 4. Moreover, the orientation of cluster 72 in FIG. 4 is the same as that of its predecessor cluster 74 shown in FIG. 3. Assuming that the four planet clusters 70 are identical, this condition of occupying the predecessors position and orientation is equivalent to the situation in which the planets never moved at all. Thus, the planet clusters 72–78, by virtue of their replacing one another, are fully indexing with respect to sun gear 60 when considered together as a planetary group 70. Third, since the orientation of the group of planet clusters 70 with respect to the primary ring 55 is unchanged, the primary ring 55 is defined herein as also being fully indexing.

In contrast, the secondary ring 65 has rotated 1/80 of a revolution, over an arc of 4.5 degrees in one line feed increment, as shown in FIG. 4 by the changed position of tab 88. Thus, the secondary ring 65 is not fully indexing. However, the secondary ring 65 does achieve tooth-to-tooth indexing. As used herein, "tooth-to-tooth indexing" means that, although the relative position of a pair of gears has changed, their position relative to the particular teeth that are currently engaged is identical. For example, in the illustrated embodiment, the secondary ring 65 has 80 teeth. Thus, a media advance of one line feed increment yields one full tooth advance for the secondary ring 65. This, tooth-to-tooth indexing advantageously results in canceling of any "tooth-to-tooth" errors. Another significant advantage of the double planetary system 50 is that all of the gears, other than the secondary gear 65, also have tooth-to-tooth error cancellation, by virtue of the other gears also being fully indexing.

The double planetary gear train 50 has several significant advantages over other high reduction ratio and indexing drive systems. For example, when compared to worm gear drives which have very high reduction ratios with indexing properties, the planetary system 50 is very energy efficient. While high reduction worm gears typically have 20% or less power transmission, the planetary system 50 is entirely composed of spur gears, which have efficiencies of over 90%.

Another earlier indexing system is a ratchet and pawl drive which uses a single-tooth pawl acting on a multi-tooth ratchet to achieve partial indexing. As mentioned in the Background portion above, it is impossible for such a system to make a partial step media advance because of its inherent inability to stop on a half tooth. In contrast, the planetary system 50 may stop the media 52 at any position if the indexing properties are ignored. Of course, operation of the feed system 48 may be easily returned to the highly accurate relative moves by advancing the media through a series of uniform subsequent line increments. This feature of feed system 48 is particularly advantageous since large media advances of any arbitrary size may be made in "white space" portions of media 52 where no printing occurs.

It is apparent that the indexing advance increment provided by the double planetary gear train 50 is designed into the gear train hardware, and thus, cannot be changed without a complete re-design of the gear train. This feature of the double planetary gear train 50 is particularly useful in printing systems where the size of the required media advance is predetermined by other hardware requirements. For example, these considerations are apparent in both impact and inkjet printers, which share this characteristic due to their fixed width printheads, such as printhead 34 on pen 30.

Another significant advantage of the indexing gear train 50 is that any defects, such as eccentricity or tooth imperfections, in the form of the individual gear train parts that are indexing do not contribute to line feed errors. This feature results because whatever dimensions are responsible for sufficiently locating a component at one particular pass of the printhead 30, 32, are the same dimensions that locate the component at the next pass of the printhead. Thus, a desirable goal is to have nearly all of the gear train components be fully indexing. Thus, the mechanical transmission of the rotary motion from motor 62 to the output shaft 66 would be without error for the particular size of the line feed increment which achieved total indexing.

One of the main advantages of the illustrated double planetary drive system 48 is that it achieves partial indexing with very small media advances. In the illustrated embodiment, 1/80 of a revolution of the secondary ring 65 is achieved without resorting to unreasonably large or small gears.

Additionally, any defects in the form of the sun gear 60 or the primary ring 55 are canceled entirely by indexing. Defects in the form of the planet clusters 70 are also canceled by indexing if the four planet clusters 72–78 are effectively identical. The planet gear clusters 72–78 may be made identical by forming them within the same mold. Thus, the double planetary train 50 is particularly well suited to using molded plastic gears. It is known to those skilled in the art that consistently perfect gears cannot be reliably made by any production process. However, virtually identical but imperfect gears are easily made by merely specifying that any single given gear train 50 be assembled only from a group of planetary clusters 70 formed from a single mold cavity.

Another advantage is realized by using a secondary ring 65 which does not achieve total indexing. Since each single line feed increment results from a very small move of the secondary ring, here, 1/80 of a revolution, typical gear defects such as eccentricity have only a very small contribution to any line feed errors. This relatively small contribution to such defects results because of the very long period of the secondary ring 65 with respect to the other components of gear train 50. This error cancellation advantage of gear train 50, as well as the accurate media advance by line increments, provide a media feed system 48 which is very rugged, durable, and highly accurate. In the past planetary gear assemblies have been used for transmitting power and for changing speed via the appropriate gear ratio. Before implementation of the illustrated embodiment, no use of a planetary gear system for error cancellation was known to the inventors. Use of molded planetary gear clusters 70, rather than cut metal gears, provides slightly imperfect gears, which, when assembled as shown in FIG. 2 provide identical errors that cancel one another in operation.

We claim:

1. A print media feed system for use in a printing mechanism having a chassis and print zone, the feed system comprising:

a media advance mechanism that propels print media through the print zone;

drive motor; and an indexing planetary gear assembly that couples the drive motor to the media advance mechanism, the assembly comprising plural components including:
   a primary ring supported by the chassis;
   a secondary ring coupled to drive the media advance mechanism;
   a sun gear driven by the drive motor; and
   four planet gear sets, each planet gear set having stacked primary and secondary planet gears, the primary planet gear engaging the primary ring, and the secondary planet gear engaging the secondary ring;

wherein for a selected line feed increment, at least two of the plural components of the planetary gear assembly are fully indexing for each line feed increment; and wherein each planet gear set has an alignment indicia, and the four planet gear sets are oriented in first and second diametrically opposed pairs around the sun gear, with said first pair having alignment indicia oriented in a first direction and said second pair having alignment indicia oriented opposite to said first direction at the beginning of a first line feed increment, while at the end of the first line feed increment, the positions and orientations of the first and second pairs of planet gear sets are exchanged from those occupied at the beginning.

2. A print media feed system according to claim 1 wherein said at least two of the plural components include the primary ring and the sun gear which are fully indexing.

3. A print media feed system according to claim 1 wherein each of the plural planet gear sets are molded gears formed in the same mold.

4. A print media feed system according to claim 3 wherein at least one of the plural components of the indexing planetary gear assembly has at least one error portion which is nonuniform with respect to other portions thereof, and wherein said molded planet gears, each formed in the same mold, cooperate to cancel any detrimental effect of said error portion.

5. A print media feed system according to claim 1 wherein each selected line feed increment comprises 1/80 of one revolution of the secondary ring.

6. A print media feed system according to claim 1 wherein the primary and secondary planet gears each have the same number of teeth.

7. A print media feed system according to claim 5 wherein said at least two of the plural components include the primary ring and the sun gear which are fully indexing.

8. A method of advancing a print media in selected line feed increments through a print zone of a printing mechanism, comprising the steps of:

coupling a media advance mechanism that propels print media through the print zone to a drive motor with an indexing planetary gear assembly which includes:
   a primary ring supported by a chassis portion of the printing mechanism;
   a secondary ring coupled to drive the media advance mechanism;
   a sun gear driven by the drive motor; and
   plural planet gear sets, each planet gear set having coaxial primary and secondary planet gears engaging the respective primary and secondary rings, with each planet gear set also having an alignment indicia; and advancing the print media through a first line feed increment, and at the beginning thereof, orienting an alignment indicia of a first planet gear set in a first direction and an alignment indicia of a second planet gear set in a direction opposite to said first direction, and at the end of the first line feed increment, moving the second planet gear set into the position and orientation occupied at the beginning of the first line feed increment by the first planet gear set.

9. A method according to claim 8 wherein:

the coupling step comprises using an indexing planetary gear assembly which includes four planet gear sets oriented in first and second diametrically opposed pairs around the sun gear; and the advancing step comprises exchanging the positions and orientations of the first and second pairs of planet gear sets during the first line feed increment from those occupied at the beginning thereof.

10. A print media feed system for use in a printing mechanism having a chassis and print zone, the feed system comprising:

a media advance mechanism that propels print media through the print zone in selected line feed increments;

a drive motor; and a planetary gear assembly that couples the drive motor to the media advance mechanism, the assembly comprising plural components including:

a primary ring supported by the chassis;

a secondary ring coupled to drive the media advance mechanism;

a sun gear driven by the drive motor; and sets each formed in the same mold, each planet gear sets having coaxial primary and secondary planet gears engaging the respective primary and secondary rings;

wherein at least one of the plural components of the planetary gear assembly has at least one error portion which is nonuniform with respect to other portions thereof, and wherein said molded planet gears, each formed in the same mold, cooperate to cancel any detrimental effect of said error portion; and wherein each planet gear set has an alignment indicia, and the four planet gear sets are oriented in first and second diametrically opposed pairs around the sun gear, with said first pair having alignment indicia oriented in a first direction and said second pair having alignment indicia oriented opposite to said first direction at the beginning of a first line feed increment, while at the end of the first line feed increment, the positions and orientations of the first and second pairs of planet gear sets are exchanged from those occupied at the beginning.

11. A print media feed system according to claim 10 wherein said at least one of the plural components of the planetary gear assembly comprises the primary ring having at least one error portion.

12. A print media feed system according to claim 10 wherein said at least one of the plural components of the planetary gear assembly comprises each of the molded planet gear sets having an identical error portion.

13. A print media feed system according to claim 10 wherein for each line feed, at least two of the plural components of the planetary gear assembly are fully indexing.

14. A print media feed system according to claim 10 wherein said at least two of the plural components include the primary ring and the sun gear which are fully indexing.

15. A print media feed system for use in a printing mechanism having a chassis and print zone, the feed system comprising:

a media advance mechanism that propels print media through the print zone in selected line feed increments;

a drive motor; and an indexing planetary gear assembly that couples the drive motor to the media advance mechanism, the assembly comprising plural components including:

a primary ring supported by the chassis;

a secondary ring coupled to drive the media advance mechanism;

a sun gear driven by the drive motor; and four planet gear sets each having coaxial primary and secondary planet gears engaging the respective primary and secondary rings;

wherein at least one of the plural components of the indexing planetary gear assembly has at least one error portion which is nonuniform with respect to other portions thereof, and for each line feed increment, and at least two of the plural components of the planetary gear assembly are fully indexing to cooperate to cancel any detrimental effect of said error portion; and wherein each planet gear set has an alignment indicia, and the four planet gear sets are oriented in first and second diametrically opposed pairs around the sun gear, with said first pair having alignment indicia oriented in a first direction and said second pair having alignment indicia oriented opposite to said first direction at the beginning of a first line feed increment, while at the end of the first line feed increment, the positions and orientations of the first and second pairs of planet gear sets are exchanged from those occupied at the beginning.

16. A print media feed system according to claim 15 wherein each of the plural planet gear sets are molded gears formed in the same mold.

17. A print media feed system for use in a printing mechanism having a chassis and print zone, the feed system comprising:

a media advance mechanism that propels print media through the print zone:

drive motor; and an indexing planetary gear assembly that couples the drive motor to the media advance mechanism, the assembly comprising plural components including:

a primary ring supported by the chassis;

a secondary ring coupled to drive the media advance mechanism;

a sun gear driven by the drive motor; and four planet gear sets, each planet gear set having stacked primary and secondary planet gears, the primary planet gear engaging the primary ring, and the secondary planet gear engaging the secondary ring;

wherein for a selected line feed increment, at least two of the plural components of the planetary gear assembly are fully indexing for each line feed increment wherein the primary ring, each planet gear set and the sun gear are fully indexing;

wherein each selected line feed increment comprises 1/80 of one revolution of the secondary ring;

wherein the primary and secondary planet gears each have the same number of teeth, and each of the plural planet gear sets are molded gears formed in the same mold to each have an alignment indicia, the four planet gear sets being oriented equidistant from one another around the sun gear, with a first two diametrically opposed planet gear sets having alignment indicia oriented in a first direction, and the other two diametrically opposed planet gear sets having alignment indicia oriented in a second direction opposite said first direction; and wherein at least one of the plural components of the indexing planetary gear assembly has at least one error portion which is nonuniform with respect to other portions thereof, and wherein said molded planet gears, each formed in the same mold cooperate to cancel any detrimental effect of said error portion.

* * * * *